United States Patent

Hahn

[15] 3,666,056
[45] May 30, 1972

[54] VIBRATION DAMPER FOR VIBRATING SCREENS

[72] Inventor: Mathew P. Hahn, Wauwatosa, Wis.

[73] Assignee: Allis-Chalmers Manufacturing Company, Milwaukee, Wis.

[22] Filed: Aug. 28, 1970

[21] Appl. No.: 67,830

[52] U.S. Cl. ................................................188/1 B, 188/83
[51] Int. Cl. ...........................................................F16f 7/08
[58] Field of Search ......................................188/1 B, 83, 129

[56] References Cited

UNITED STATES PATENTS

| | | |
|---|---|---|
| 1,823,162 | 9/1931 | Pearson et al. ................... 188/1 B UX |
| 2,119,027 | 5/1938 | Rondelle ........................... 188/1 B UX |
| 2,380,013 | 7/1945 | Bankauf .............................. 188/1 B |
| 2,424,004 | 7/1947 | Terrell ............................. 188/1 B X |
| 2,639,195 | 5/1953 | Bock .................................. 188/1 B UX |

*Primary Examiner*—Duane A. Reger
*Attorney*—Arthur M. Streich, Robert B. Benson and John P. Hines

[57] ABSTRACT

A vibration damper for a vibrating screen is provided with tubular housing and a flexible cylinder arranged within the tubular housing, with the flexible cylinder projecting outwardly of one end of the housing. The flexible cylinder provides a friction surface perpendicular to a central axis through the cylinder. The end of the cylinder opposite the friction surface, is spaced inwardly from the adjacent end of the housing. A ram assembly is connected to the second end of the housing. The ram assembly includes a rigid member arranged within the housing to engage the adjacent end of the flexible cylinder and cap mounted over the second end opening of the housing. The cap is provided with a central axial bore, at least partly threaded, into which is fitted a threaded actuating bolt which extends therethrough and engages the rigid member. The bolt is operative upon turning to move the rigid member toward the flexible cylinder and apply an adjustable force biasing the flexible cylinder to move the friction surface outwardly of the first end opening of the tubular housing for vibration dampening engagement with a vibrating screen. The end of the tubular housing surrounding the friction surface end of the flexible cylinder is spaced radially outward of the flexible cylinder and limits flexing of the flexible cylinder transversely to the central axis through the tubular housing.

11 Claims, 4 Drawing Figures

Patented May 30, 1972  3,666,056

Inventor
Mathew P. Hahn
By Arthur M. Streich
Attorney

VIBRATION DAMPER FOR VIBRATING SCREENS

BACKGROUND OF THE INVENTION

1. Field of the Invention

This invention relates to material separating vibrating screens and in particular to vibration dampers for such machines and the like.

2. Description of the Prior Art

A vibrating screen of the type to which the present invention may be applied is disclosed in U.S. Pat. No. 2,292,327. It has long been known that when starting and stopping such a screen, the screen passes through a critical speed at which the amplitude of vibration can increase to such a violent degree that, if unchecked, the screen can suffer structural damage. An example of a damper device according to the prior art for checking such violent vibrations, is shown in U.S. Pat. No. 2,380,013. Such damper devices utilize a coil spring for urging a pair of friction blocks into contact with vertical wall surfaces. Vibratory movement of a screen connected to a sleeve about the blocks, in excess of a predetermined amplitude, slides the blocks along the surfaces with a drag that dampens the vibrations. If it is desired to increase the force with which each friction block is urged against a surface, or if after a period of operation such force has become less, it is necessary to stop the machine, dismantle the damper and replace the spring. As will appear from the description of the present invention to follow, it is to such undesired requirements associated with prior art screen dampers, that the present invention is directed.

SUMMARY OF THE PRESENT INVENTION

It is among the objects of the present invention to provide a new and improved vibration damper for vibrating screens and the like which is of simple inexpensive construction that can apply an adjustable vibration dampening force, and which can be adjusted without stopping the vibrating screen.

According to a preferred embodiment of the present invention, a vibration damper for a vibrating screen is provided with an elongated tubular housing which defines first and second end openings. A flexible means is arranged within the tubular housing and the flexible means may comprise a cylinder, which may be rubber, with a cylindrical wear resistant shoe axially aligned with and connected on one end to the rubber cylinder, and with the shoe projecting outwardly of the first end opening of the housing. The shoe provides a friction surface perpendicular to a central axis through the shoe and rubber cylinder. A second end of the flexible means, that is the end thereof opposite the shoe, is spaced inwardly from the second end opening of the tubular housing. A ram assembly is connected to the second end opening of the tubular housing. The ram assembly comprises several parts, including a rigid member arranged within the tubular housing to engage the adjacent end of the flexible means, and cap mounted over the second end opening of the tubular housing. The cap is provided with a central axial bore, at least partly threaded, into which is fitted a threaded actuating bolt which extends therethrough and engages the rigid member. The shaft is operative upon turning to move the rigid member toward the flexible means and apply an adjustable force biasing the flexible means to move the shoe friction surface outwardly of the first end opening of the tubular housing for vibration dampening engagement with a vibrating screen. The flexible means, that is both the flexible cylinder and the shoe, are provided with a diameter which is smaller than the internal diameter of the surrounding first end opening of the tubular housing. The tubular housing end surrounding the shoe end of the flexible means is therefore spaced radially outward of the flexible means and limits flexing of the flexible means transversely to the central axis through the tubular housing, to an amount equal to such spacing. A vibration of a body engaged by the friction surface of the shoe, of greater amplitude than that accommodated by such spacing, causes the body to skid across the friction surface of the shoe. The ram assembly is operative however, upon turning the actuating shaft to move the rigid member toward the flexible means, to increase the pressure of the friction surface on the engaged vibrating body until such pressure causes the body to skid across the friction surface with a drag sufficient to dampen vibrations of such greater amplitude.

Other features and objects of the invention that have been attained will appear from the more detailed description to follow with reference to several embodiments of the present invention shown in the accompanying drawings.

DESCRIPTION OF THE PREFERRED EMBODIMENTS

Figure 1:
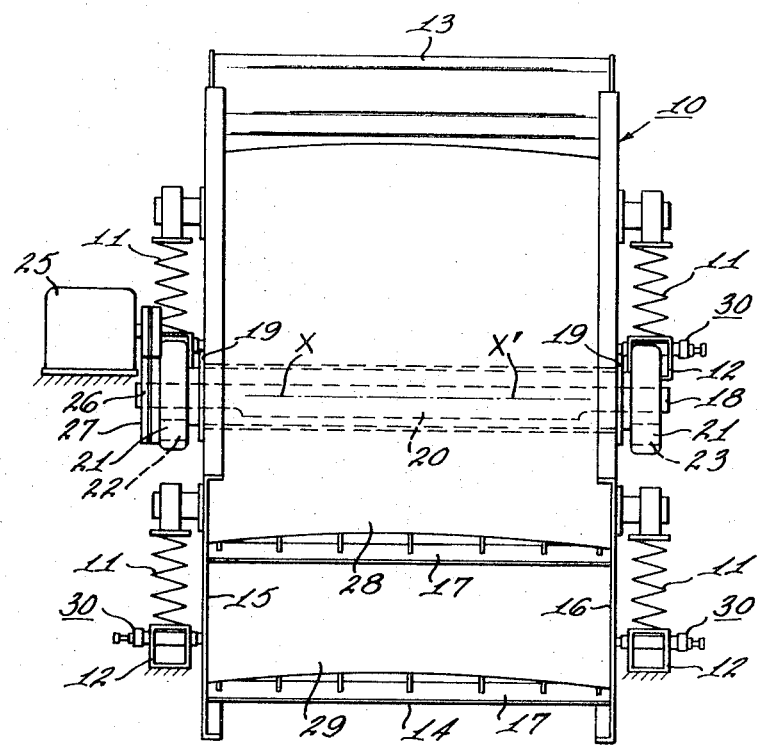
FIG. 1 of the accompanying drawings shows an end view of a vibrating screen with a pair of vibration dampers according to one embodiment of the present invention.

Referring to FIG. 1, a vibrating screen is shown such as is disclosed in U.S. Pat. No. 2,292,327. The screen has a body 10 supported by springs 11 which are mounted on stationary support structures 12. The upper ends of springs 11 are connected to the screen body 10, with the screen body 10 supported at an incline to a horizontal plane placing a feed end 13 at a higher level than a discharge end 14. The screen body 10 comprises vertical side walls 15, 16 spaced apart horizontally by a plurality of rigid cross beams 17. A drive shaft 18 is journaled in bearings 19. The drive shaft 18 may be constructed as shown in U.S. Pat. No. 2,292,327 and carries eccentric mass 20 counterbalancing the screen body relative to an axis X—X' transverse to side walls 15, 16 and about which (axis X—X') the screen gyrates with substantially all points on the screen assembly moving to trace, in the vertical planes defined by side walls 15, 16, a circular path of motion. Balance wheels 21 may be mounted on shaft 18 outboard of walls 15, 16, and weights 22, 23 may be attached thereto to provide eccentric counterbalancing mass to supplement the eccentric mass 20 of shaft 18 or as an alternate to mass 20. The drive shaft 18 is driven by a motor 25 through belts 26 connected to drive a pulley 27 mounted on one end of the drive shaft 18. The screen body 10 is shown as being provided with two decks or screen surfaces 28, 29. The screen surfaces 28, 29 are supported by the cross beams 17. A vibration damper 30 is mounted in each of the stationary support structures 12 to engage adjacent screen side walls 15, 16. The dampers 30 will be described in detail with reference to FIG. 2.

Figures 2, 4:
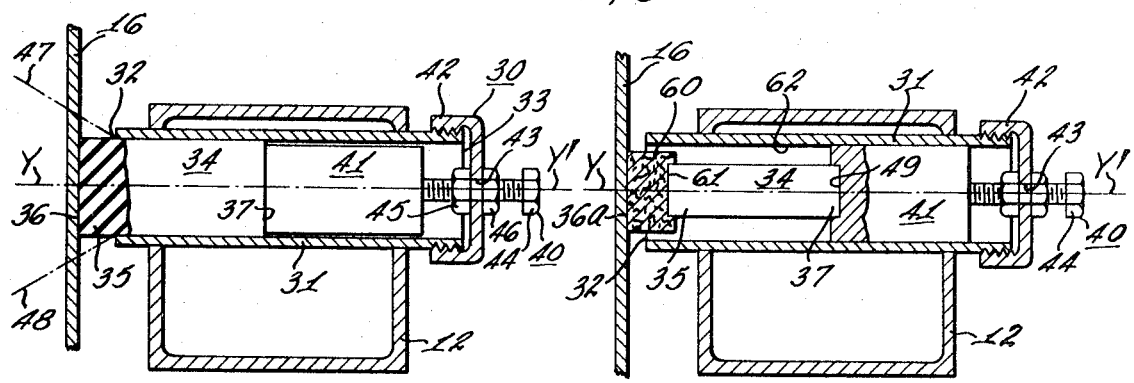
FIG. 2 is a fragmentary view of the screen of FIG. 1 showing one of the vibration dampers to enlarged scale.
FIG. 4 is a view similar to FIG. 2 showing still another embodiment of the present invention.

Referring to FIG. 2 the vibration damper 30 is shown as comprising an elongated tubular housing 31 which defines a first end opening 32 and a second end opening 33. A flexible means, here indicated to be a rubber cylinder 34, is arranged within the tubular housing 31 with a first end portion 35 projecting outwardly of the first end opening 32 of the tubular housing 31. The rubber cylinder 34 provides a friction surface 36 perpendicular to a central axis Y—Y' through rubber cylinder 34 and tubular housing 31. A second end portion 37 of the rubber cylinder 34 is spaced inwardly from the second end opening 33 of the tubular housing 31.

A ram assembly 40 is connected to the second end opening 33 of the tubular housing 31. The ram assembly 40 comprises several parts which will now be described. The ram assembly 40 includes a rigid member 41 arranged within the tubular housing 31 to engage the second end portion 37 of the rubber cylinder 34. A cap 42 is mounted over the second end opening 33 of the tubular housing 31. Cap 42 may be secured to housing 31 by any suitable means such as engaging threads. The cap 42 is provided with a central axially extending bore 43 into which is fitted an actuating shaft which may be a threaded bolt 44. A threaded nut 45 may be spot welded to the inside of cap 42 in register with bore 43 to provide threads for engagement with bolt 44. A second threaded nut 46 may be turned on bolt 44 so that bolt 44 may be secured in any axial position relative to cap 42 and bore 43 between the pair of threaded nuts 45, 46.

In the operation of the damper 30 as shown in FIG. 2, gyration of side wall 16 will cause the first end portion 35 of rubber cylinder 34 to flex about central axis Y—Y' without relative movement between friction surface 36 and side wall 16 provided the amplitude of vibration does not exceed certain predetermined limits indicated by the broken lines 47 and 48. Vibrations having an amplitude greater than indicated by the broken lines 47, 48 will cause side wall 16 to skid across the friction surface 36. Turning bolt 44 to move the rigid member 41 toward the rubber cylinder 34 increases the pressure of the friction surface 36 on side wall 16 and by turning bolt 44 such pressure can be increased until such pressure provides a drag which is effective to dampen vibrations having an amplitude that carries the screen and side wall 16 beyond the limits indicated by lines 47, 48.

Figure 3:
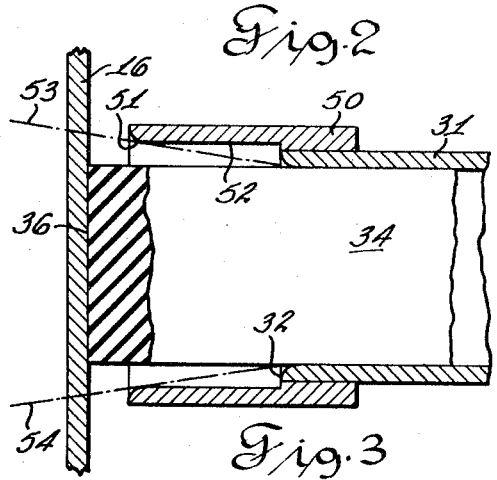
FIG. 3 is a fragmentary view of a vibration damper such as shown in FIG. 2, but to enlarged scale and showing another embodiment of the present invention.

Referring to FIG. 3 an embodiment of the present invention is shown which is a modification of the embodiment of FIG. 1 and in which a tubular extension piece 50 is mounted on the housing 31 around the first end opening 32. The piece 50 projects away from the first end opening 32 of the housing 31 and defines a lip 51 around the rubber cylinder 34 which is intermediate the first end opening 32 of the housing 31 and the friction surface 36. The tubular extension piece 50 has an internal surface 52 between the first end opening 32 of the housing 31 and the lip 51 of the extension piece 50, which is spaced radially outward of the rubber cylinder 34. The lip 51 and internal surface 52 of extension piece 50 are engaged by the rubber cylinder 34 when the rubber cylinder 34 flexes an amount indicated by the lines 53, 54. Flexing of rubber cylinder 34 through a greater amplitude than indicated by lines 53, 54 is prevented by surface 52 and lip 51, and when side wall 16 does vibrate with such greater amplitudes side wall 16 skids along friction surface 36 with a vibration dampening drag as has been described with regard to the embodiment of FIG. 2.

Referring to FIG. 4 another embodiment of the present invention is shown which involves other modifications of the embodiment of FIG. 1. As shown in FIG. 4, the flexible means comprises a flexible cylinder which in this embodiment may be a rubber cylinder 34 or a coil spring (not shown), and a wear resistant shoe 60 for providing a friction surface 36a perpendicular to the central axis Y—Y' through the tubular housing 31. The friction surface 36a engages side wall 16 in the same manner as surface 36 shown in FIGS. 2 and 3. The shoe 60 shown in FIG. 4 may be made of any suitable material such as is commercially available and often used for wear resistant surfaces of brakes and clutches. The shoe 60 is partly within tubular housing 31 and projects outwardly of the first end opening 32 to engage side wall 16. In this embodiment the rigid member 41 of the ram assembly 40, has an outer circumference engaging the surrounding tubular housing 31, as is the case with the embodiment of FIG. 2, but in the embodiment of FIG. 4 the rigid member 41 defines a circular recess 49 into which the second end portion 37 of the rubber cylinder 34 is fitted. The rubber cylinder 34 has a diameter smaller than the diameters of both the rigid member 41 and the shoe 60 and the first end portion 35 of the rubber cylinder 34 is also fitted into a circular recess 61 defined in shoe 60. Although the shoe 60 has a diameter larger than the diameter of the rubber cylinder 34, the diameter of shoe 60 is however smaller than the diameter of an inner circumferential surface 62 of the surrounding tubular housing 31. The inner surface 62 limits the amplitude of vibration of the shoe 60 to an amount equal to the radial distance between the shoe 60 and the inner surface 62 of housing 31. Vibration of side wall 16 of an amplitude greater than that permitted by the surface 62 of housing 31, causes the side wall 16 to skid along friction surface 36a with the vibration dampening drag as has been described with regard to the embodiments of FIGS. 2 and 3.

In the ram assembly of the embodiment of FIG. 4 a cap 42 with a bore 43 and an actuating bolt 44, also provides for adjusting the pressure of the friction surface 36a on side wall 16.

In each of the described embodiments of the present invention the vibration damper is operative to provide an adjustable vibration dampening force which can be adjusted without stopping the vibrating screen. From the foregoing detailed description of the present invention it has therefore been shown how the objects of the present invention have been attained. However, modification and equivalents of the disclosed concepts such as readily occur to those skilled in the art are intended to be included in the scope of this invention. Thus, the scope of the invention is intended to be limited only by the scope of the claims such as are or may hereafter be, appended hereto.

The embodiments of the invention in which an exclusive property or privilege is claimed are defined as follows:

1. A vibration damper for vibrating screens and the like comprising:
    A. an elongated housing defining first and second end openings;
    B. flexible means arranged within the housing and having a first end portion thereof projecting outwardly from the first end opening of the housing, the first end portion defining a friction surface perpendicular to a central axis through the flexible means with said first end portion being spaced radially inward of the housing to define a surrounding space between the first end portion and the housing with said first end portion being bendable in said surrounding space for transverse displacement away from said central axis, and the flexible means having a second end portion spaced inwardly from the second end opening of the housing; and
    C. a ram assembly connected to the housing about the second end opening of the housing and operable to engage the second end portion of the flexible means and apply an adjustable force thereto in the direction of the first end portion thereof biasing the flexible means to move the friction surface outwardly of the first end opening of the housing for vibration dampening engagement with a vibrating screen.

2. A vibration damper for vibrating screens and the like comprising:
    A. a tubular housing defining first and second end openings;
    B. flexible cylindrical means arranged within the housing and having a first end portion thereof projecting outwardly from the first end opening of the housing, the first end portion defining a friction surface perpendicular to a central axis through the flexible cylindrical means with the said first end portion being spaced radially inward of the housing to define an annular space between the first end portion and the housing with said first end portion being bendable in said annular space for transverse displacement away from said central axis, and the flexible cylindrical means having a second end portion spaced inwardly from the second end opening of the housing; and
    C. a ram assembly connected to the housing about the second end opening of the housing and operable to engage the second end portion of the flexible cylindrical means and apply an adjustable force thereto in the direction of the first end portion thereof biasing the flexible cylindrical means to move the friction surface outwardly of the first end opening of the tubular housing for vibration dampening engagement with the vibrating screen.

3. A vibration damper according to claim 1 having an extension price mounted on the housing around the first end opening and projecting away therefrom and defining a lip intermediate the first end opening of the housing and the friction surface of the flexible means, and the extension piece having an internal surface between the first end of the housing and the lip with the internal surface being spaced outwardly of the flexible means whereby the internal surface of the extension piece and the lip limit flexing of the flexible means transversely to the central axis through the flexible means.

4. A vibration damper according to claim 1 in which the ram assembly includes a rigid member arranged within the housing with the rigid member engaging the second end portion of the flexible member.

5. A vibration damper according to claim 1 in which the ram assembly includes a cap mounted over the second end opening of the housing and connected to the housing, the cap defines a bore axially aligned with the central axis through the flexible means, and an actuating shaft extending through the bore with the shaft being operative to move toward the flexible means to bias the flexible means to move the friction surface outwardly of the first end opening of the housing.

6. A vibration damper according to claim 5 in which the ram assembly includes a rigid member arranged within the housing with the rigid member engaging the second end portion of the flexible means and the actuating shaft engaging the rigid member.

7. A vibration damper according to claim 5 in which the actuating shaft and the bore are provided with engaging threads to provide for axial movement of the actuating shaft relative to the bore upon rotation of the shaft.

8. A vibration damper according to claim 1 in which the first end portion of the flexible means is a wear resistant shoe defining the friction surface perpendicular to the axis through the flexible means.

9. A vibration damper according to claim 2 in which the flexible means comprise a flexible cylinder and a cylindrical wear resistant shoe axially aligned and arranged with the shoe projecting outwardly of the first end opening of the housing, with the shoe defining the friction surface perpendicular to the central axis through the shoe and flexible cylinder, and with the shoe having a diameter smaller than the internal diameter of the tubular housing whereby the tubular housing surrounding the cylindrical shoe limits flexing of the flexible cylinder transversely to the central axis through the shoe and flexible cylinder.

10. A vibration damper according to claim 9 in which the ram assembly includes a rigid cylinder arranged within the tubular housing with the rigid cylinder having an outer circumference engaging the surrounding tubular housing and an end engaging the flexible cylinder.

11. A vibration damper according to claim 10 in which the flexible cylinder has an outer diameter smaller than the outer diameter of both shoe and the rigid cylinder, and the shoe and rigid cylinder both define circular recesses into which the respective ends of the flexible cylinder project.

* * * * *